(12) United States Patent
Rozine et al.

(10) Patent No.: US 7,301,743 B2
(45) Date of Patent: Nov. 27, 2007

(54) DEVICE AND A METHOD FOR ADVANCED PROTECTION FROM SHORT CIRCUIT CURRENT

(76) Inventors: Vassili Rozine, 1004 Rochester Ave., Coquitlam (CA) V3K 2W7; Max H. Adams, 426 W. Keith Rd., North Vancouver (CA) V7M 1M3

( * ) Notice: Subject to any disclaimer, the term of this patent is extended or adjusted under 35 U.S.C. 154(b) by 86 days.

(21) Appl. No.: 11/308,625

(22) Filed: Apr. 13, 2006

(65) Prior Publication Data

US 2006/0291121 A1 Dec. 28, 2006

(51) Int. Cl.
*H02H 9/08* (2006.01)
(52) U.S. Cl. ..................................... 361/93.9
(58) Field of Classification Search ............... 361/93.9, 361/62, 78, 87
See application file for complete search history.

(56) References Cited

U.S. PATENT DOCUMENTS

| | | | | |
|---|---|---|---|---|
| 4,631,622 A | * | 12/1986 | Howell | 361/45 |
| 5,181,155 A | * | 1/1993 | Beg et al. | 361/94 |
| 6,061,217 A | * | 5/2000 | Grunert et al. | 361/42 |
| 6,373,014 B1 | * | 4/2002 | Mitsuhashi et al. | 218/22 |
| 6,633,474 B1 | * | 10/2003 | Boudaud | 361/95 |
| 6,873,236 B2 | * | 3/2005 | Shah et al. | 336/58 |

\* cited by examiner

*Primary Examiner*—Michael Sherry
*Assistant Examiner*—Boris Benenson

(57) ABSTRACT

A two channel universal device for advanced protection from a short circuit current which evaluates a rate-of-change of current in a supply feeder and compares the current in the supply feeder and the current in load phases generating a differential signal in such a way that in normal conditions, when the load is running or starting, the differential signal is virtually zero. The differential signal and the rate-of-change of current in the supply feeder are compared with the settings of the protective device. If both the value of the rate-of-change of current and the value of the differential signal simultaneously exceed their settings, after an adjustable time delay, the device produces a signal to open the circuit. The existence of two conditions necessary to initiate the trip signal to cause the circuit to open ensures the reliable operation of this device and provides a feasible fast protection scheme.

2 Claims, 5 Drawing Sheets

DEVICE AND A METHOD FOR ADVANCED PROTECTION FROM SHORT CIRCUIT CURRENT

CROSS-REFERENCE

Latest protection arrangements in this field are shown in the following United States of America patents:

| | | |
|---|---|---|
| 5,181,155 | Jan. 19, 1993 | Beg et al. |
| 6,061,217 | May 09, 2000 | Grunert et al. |
| 6,373,014 | Apr. 16, 2002 | Mitsuhashi et al. |
| 6,633,474 | Oct. 14, 2003 | Boudaud |
| 6,873,236 | Mar. 29, 2005 | Shah et al. |

BACKGROUND OF THE INVENTION

The invention is generally associated with fault detection and circuit protection devices (circuit breakers) in AC power electrical systems. It could also be used in DC power electrical protection systems.

Circuit breakers are used to protect electrical circuits from a short circuit current and overloads. These devices in conjunction with the fault detection relay, in general, are designed to sense the existence of the fault current in the protected circuit and then to disconnect the faulty circuit from the source of power. In some devices the trip operation setting (the level of the current which leads to the operation of the protective device) can be adjusted and in some devices it is fixed during the manufacture; but all circuit breakers require a device or means to first sense the existence of an abnormally high current and then disconnect the circuit in a time interval necessary for the physical operation of the circuit breaker contact mechanism (if intentional delay is not provided).

The time interval between the beginning of the short circuit current and the disconnection of the circuit is crucial. A fast disconnection helps to reduce damage to equipment due to high current flow through the circuit and circuit components.

In many cases another issue is also very important. This is a protection selectivity (coordination) problem. When two or more circuit breakers are connected in series in a distribution system, between the source of power and the consumer, it is a requirement of standards and codes to have an arrangement in which only the device closest to the fault point is disconnected during the fault, and all other devices remain unaffected so that the other parts of the distribution system are not disconnected from their source of power. When circuit breakers connected in series are similar in size and the short circuit available in the circuit is more than the maximum instantaneous trip setting of all of them, the probability is high that more than one circuit breaker will trip as a result of a fault. In some distribution systems, such as emergency systems, this situation is not acceptable and actions have to be taken to avoid it. A possible solution is to replace the up-stream circuit breaker with another of a larger frame size and very often with a solid state trip unit. It allows the provision of an instantaneous trip setting exceeding the fault current level in the circuit. This is usually expensive and this solution increases the thermal stress on the system during a fault. Sometimes this solution is not enough, and the next option is to install devices like a current limiting reactor in the circuit in order to reduce the circuit fault current and shift the circuit characteristics. This assumes that the up-stream circuit breaker protection characteristics are no longer in the instantaneous trip operation zone. Depending on the characteristics of the circuit, such current limiting devices can be expensive and heavy pieces of equipment.

Faster operation of the down-stream circuit breaker could be helpful, however, in most cases, when up-stream and down-stream circuit breakers see the fault current exceeding their instantaneous settings, even if one of them, usually the down-stream breaker, begins to operate first, the other circuit breaker will trip as well.

At the same time, if the down-stream circuit breaker operates very fast and its contacts start to open before the fault current reaches the instantaneous trip setting of the up stream-breaker, the dynamic impedance of the down stream breaker prevents the up-stream breaker from tripping.

Another approach to this problem is to detect the rate-of-change of the circuit current and develop a control signal to open the breaker even before the fault current reaches an abnormal level. Protection relays with this control philosophy exist, but the use of these devices is limited to special applications.

The presence of a motor load or a step load makes this type of protection unreliable. The conditions of the operation depend on the parameters of the circuit and very often there is no way to distinguish between the initial current of an electric motor starting or initial load current and a fault current.

There are other numerous approaches including traditional fuses, semi-conductors and superconductors.

BRIEF SUMMARY OF THE INVENTION

The objective of the invention is to create a device able to determine the existence of fault current conditions in a circuit before the actual amplitude of the current reaches its full level; thereby dramatically reducing the time between a fault occurring, the detection of the short circuit current, and the generation of the circuit breaker tripping signal to disconnect the circuit. The device determines if the high rate-of-change of the current is caused by normal circuit variations, such as motor starting or initial load energized current, and does not generate the tripping signal to disconnect the circuit.

BRIEF DESCRIPTION FO THE SEVERAL VIEWS OF THE DRAWINGS

DETAILED DESCRIPTION OF THE INVENTION

Figure 1:
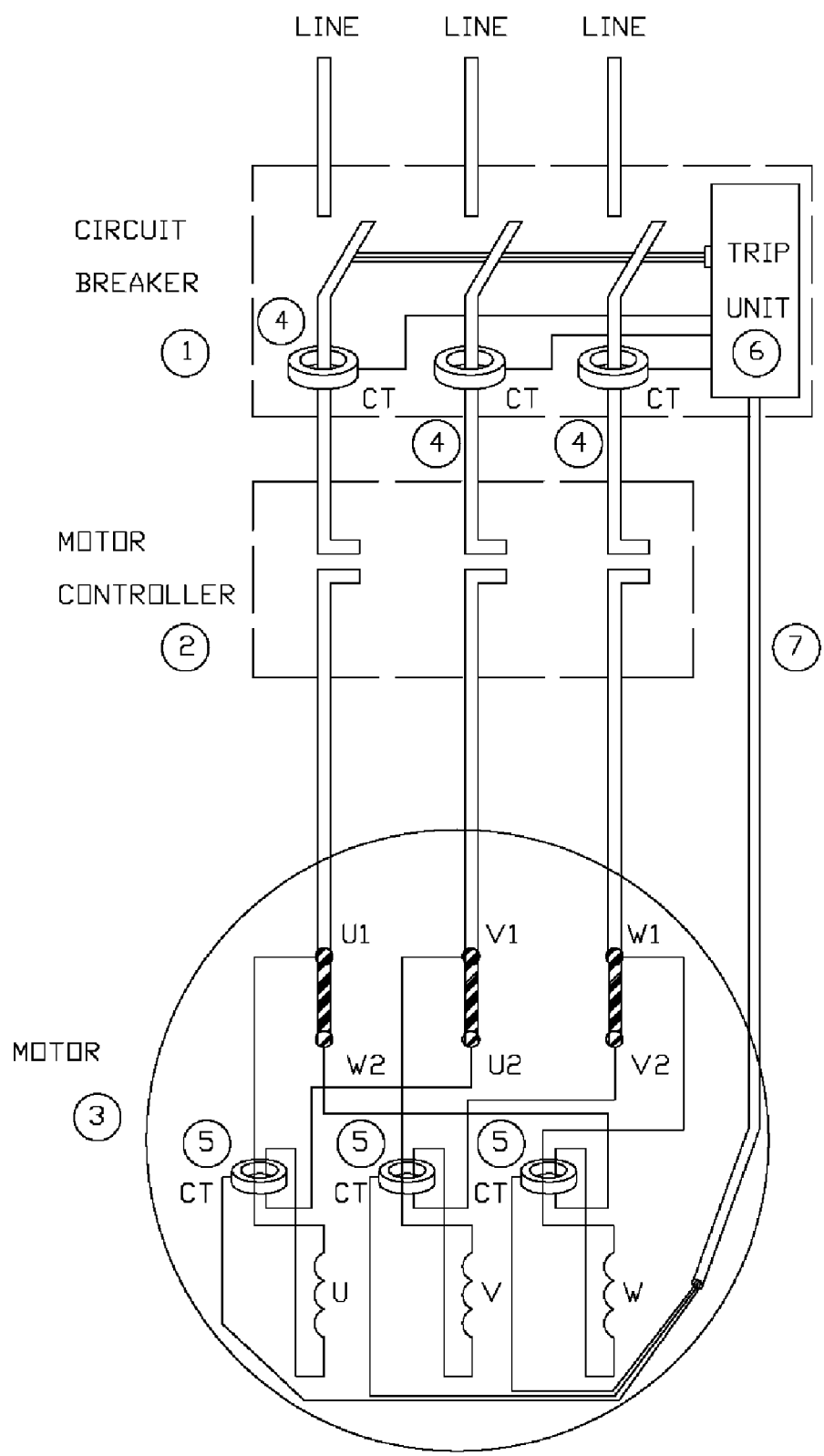
FIG. 1 is a typical diagram of a circuit breaker connected to a motor controller and a motor with a delta connection in accordance with the present invention.
Figure 2:
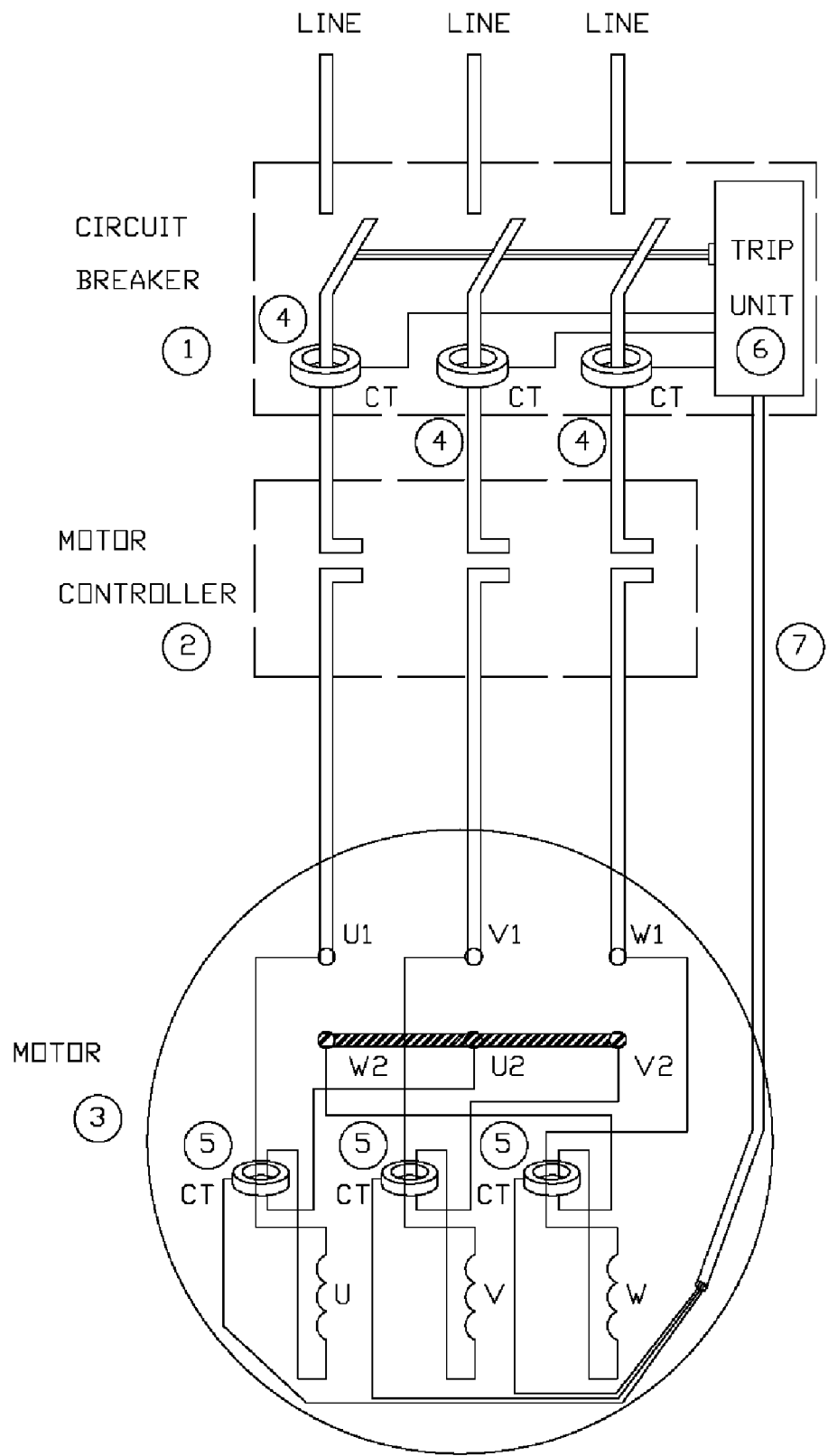
FIG. 2 is another typical diagram of a circuit breaker connected to a motor controller and a motor with a star connection in accordance with the present invention.

Referring to the drawings; FIG. 1 and FIG. 2 show the typical view of the possible embodiment of the present invention with a motor load. A circuit breaker 1 is a supply circuit breaker for a motor 3. A motor controller contactor 2 is closed when motor 3 in operating. The important parts of circuit breaker 1 are current transformers 4 and a trip unit 6.

Trip unit 6 is connected to current transformers 4 which are part of circuit breaker 1 and measure the currents in the supply feeder (line) and to the current transformers 5 which form a part of the protection for motor 3 and measure currents in the motor phases. Current transformers can be replaced with any form of suitable current transducers. Trip unit 6 evaluates a rate-of-change of current in the supply feeder and produces a differential signal proportional to a difference between a current in the supply feeder and the current in the motor. To obtain a true differential signal, the connections of the current transformer 5 secondary windings shall be different for delta and star connected motors. If the rate-of-change of current and the differential signal exceed the circuit breaker settings, after a time delay, trip unit 6 generates a tripping signal and open the breaker.

Current in each motor winding phase passes through current transformer 5 twice (once at the beginning and once at the end of each phase; the current transformers are located just below the motor terminal box), so that the current signal is proportional to a double current value when a motor operates in normal conditions. The motor current signals are reduced by the ratio of 1 to 2 in trip unit 6.

Current transformers 5 are connected to trip unit 6 via a cable 7; this connection could be a wireless connection as long as it is reliable and provides electromagnetic compatibility. A simple shielded triad would be adequate for this task.

Currents in a motor during normal operation or starting conditions offset the values in a supply feeder because it is basically the same current, hence the differential signal is zero and trip unit 6 does not generate an actuating signal. If a fault occurs anywhere between circuit breaker 1 and motor 3, the current in the feeder is not offset by a motor current because, in this case, motor 3 provides a current contribution to the point of fault and a motor current is in opposite phase to a current from a source. In this case both, the rate-of-change of current in the feeder and the resultant differential signal, may exceed the trip unit setting. Trip unit 6 generates the tripping signal and after an pre set intentional time delay circuit breaker 1 trips.

If a fault occurs inside the motor, currents in the beginning and in the end of the faulty phase are not identical any more and the motor current signal is not proportional to the double current value. The feeder current is not offset by a motor current and if the resultant differential signal exceeds the trip unit setting and the rate-of-change of current in the feeder exceeds the trip unit setting, the trip unit generates the tripping signal and after an pre set intentional time delay circuit breaker 1 trips.

FIG. 2 is another typical diagram of a circuit breaker connected to a motor controller and a motor with a star connection in accordance with the present invention. A star connection allows measurement of currents only in the end of the winding phase to satisfactory protect a motor from an internal fault, however, to provide a standard approach, it is recommended to use the same arrangement as for delta connected motors.

Figure 3:
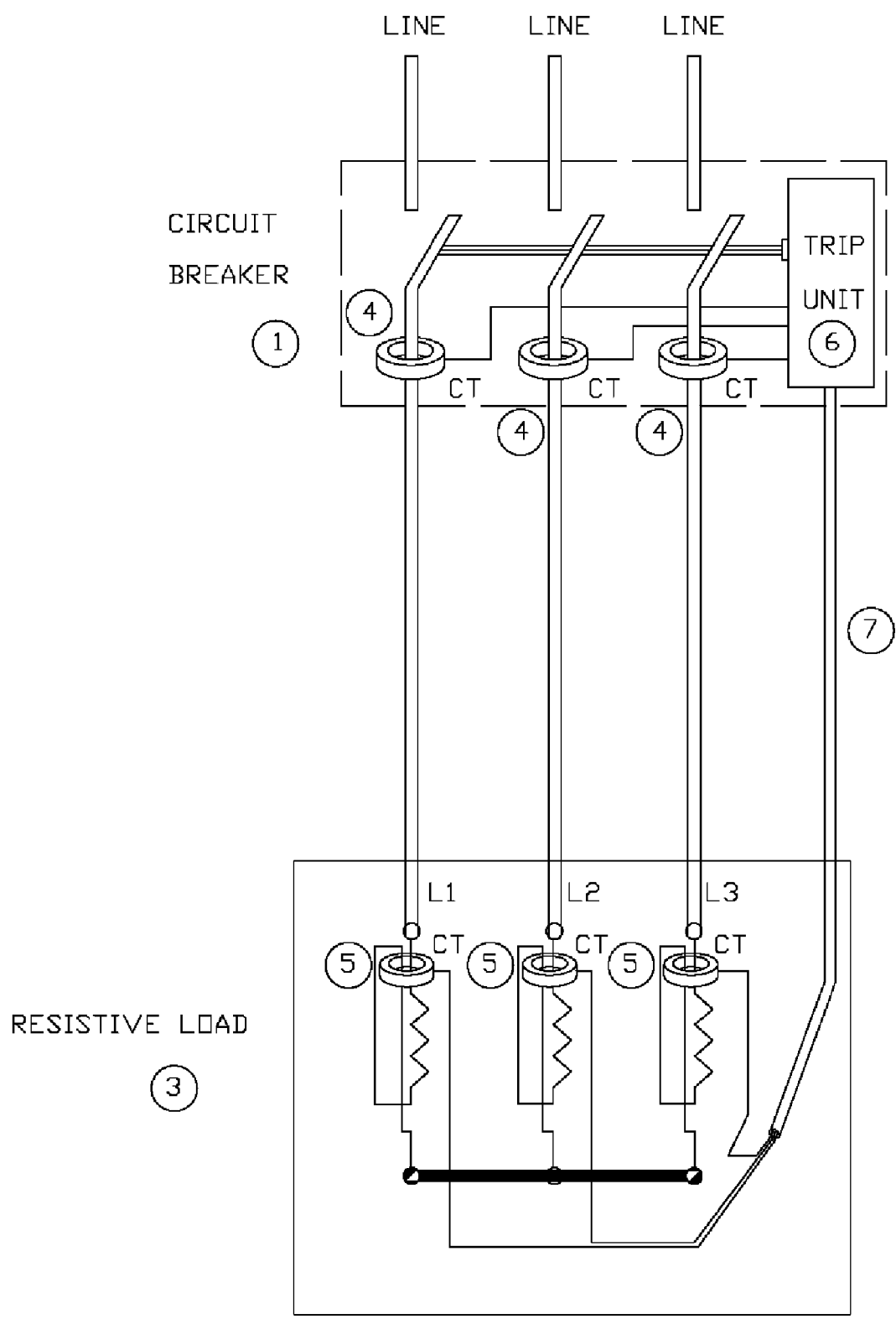
FIG. 3 is a typical diagram of a circuit breaker connected to a resistive load in accordance with the present invention.

FIG. 3 is a typical diagram of a circuit breaker connected to a resistive load in accordance with the present invention. It copies all the features introduced earlier and differs only in a type of load. If current transducers are connected in the end of a feeder outside a load, such an arrangement will not protect the circuit against an internal load fault. To provide a complete protection, current transducers shall be connected in the same manner as for motor loads.

Figure 4:
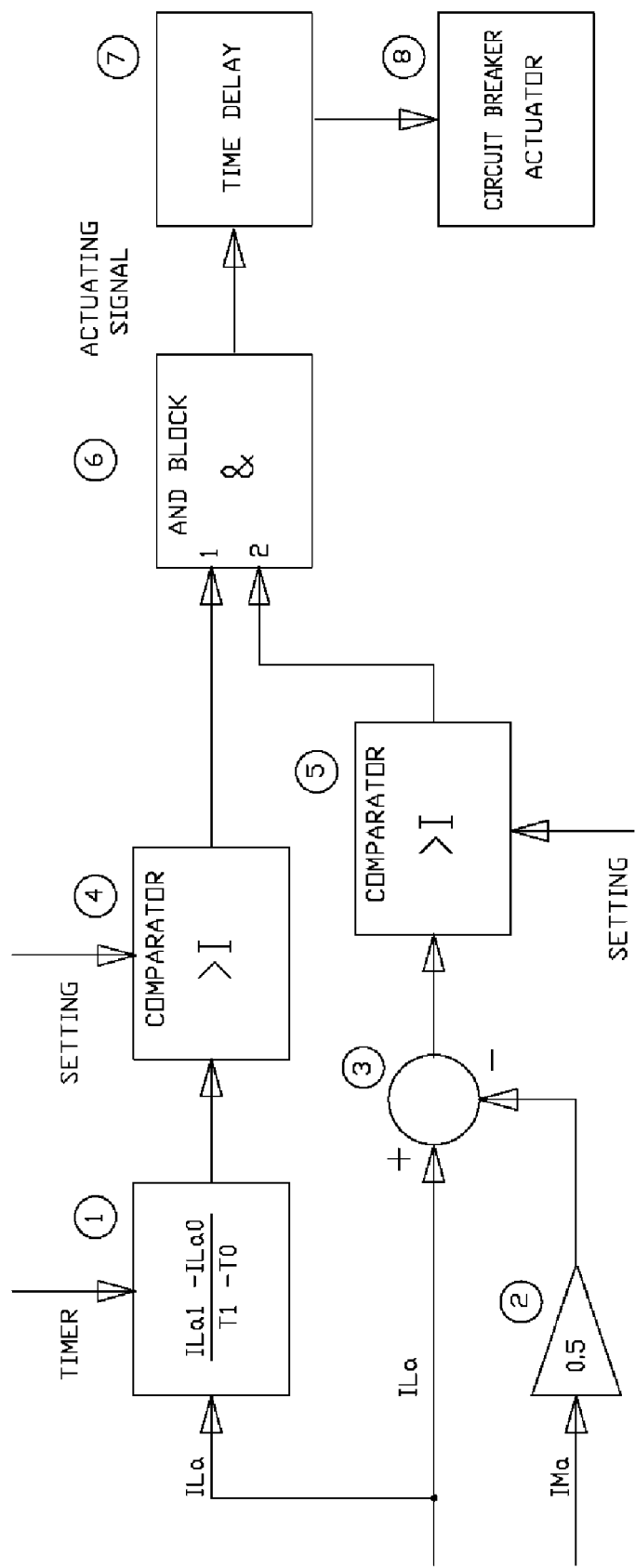
FIG. 4 is a schematic diagram of the part of the trip unit of the system of FIGS. 1, 2 and 3.

FIG. 4 is a schematic view of the part of trip unit 6 of FIG. 1, FIG. 2 and FIG. 3 for one phase only. The schematics of other two phases are identical. This schematic can be implemented using standard microcontrollers. The output of current transducers in the supply feeder are connected to modules 1 and 3 (for all phases). Module 1 provides the discrete measurement of input current signal ILa at least every 0.1 ms and calculates the rate-of-change of current by comparing sampled data. The gain module 2 reduces the current signal from current transducer in the load by the ratio of 1 to 2. Summing point 3 provides subtraction of the current signal in the supply feeder and the processed current signal in the load, hence in normal conditions (motor or load in operation or starting), when the current in the load phase and the current in the feeder phase are identical, the output of summing point 3 is close to zero limited by the errors in the measurement circuits. The output of module 1 is connected to comparator 4, which compares the rate-of-change of current in the supply feeder with the protective device first setting. If the comparator 4 input signal exceeds the setting, the module provides a logical 1 to the input 1 of block 6. The protective device first setting is adjustable in the range of 5-20 times of rate-of-change of nominal current. The output of summing point 3 is connected to comparator 5, which compares the signal from summing point 3 with the protective device second setting. If the comparator 5 input signal exceeds the setting, the module provides a logical 1 to the input 2 of block 6. The protective device second adjustable setting is usually in the range of 0.1-0.5 of the rated current of the transducer's current. Block 6 is a logical AND block and if both inputs are 1, it starts the time delay block 7. After an adjustable predetermined time delay (typically 0.5 ms) and if both inputs of the block 6 are still logical 1, circuit breaker actuator 7 is activated and a protective device is tripped.

Figure 5:
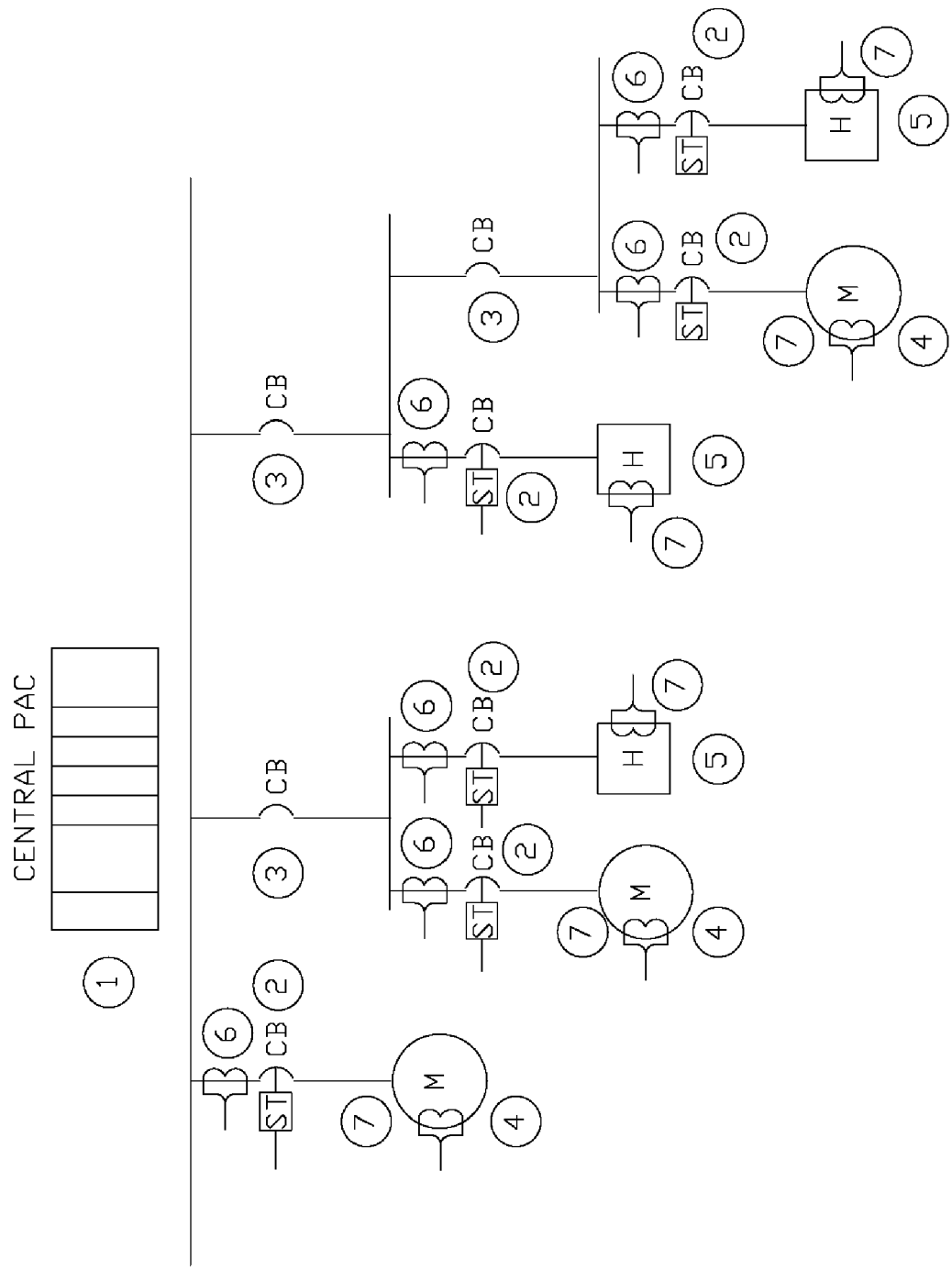
FIG. 5 represents another possible embodiment of the present invention. The typical distribution system is protected by circuit breakers which are controlled from the central programmable automation controller.

FIG. 5 shows another possible embodiment of the present invention. This is a typical distribution system with different levels of distribution. Connections between the central programmable automation controller PAC 1 and current transducers 6 and 7 and between central PAC 1 and shunt trips of circuit breakers 2 are not shown to enhance the clarity of the drawing. For this example, the system supplies power to motors 4 and heaters 5. Circuit breakers 2 in the final circuits represent the fast breakers which have only a shunt trip mechanism and an overload protection. They are controlled from central PAC 1. Circuit breakers 3 are not in final circuits and are conventional types of breakers. Central PAC 1 measures currents from current transformers 6 in supply feeders and from current transformers 7 in loads. If a rate-of-change of a current and the resultant differential current signal exceed the predetermined setting, central PAC 1 generates a control signal to activate the respective shunt trip and open the breaker.

Generating a pre-arming tripping signal, when a fault current does not reach abnormal level provides a way for the fast trip of a breaker (depending on the speed of the disconnecting mechanism). Fast and early tripping of circuit breakers guarantees lower damage from the flow of high short circuit current and, if this breaker is a down-stream breaker, it provides an adequate coordination with the upstream breaker which, in this case, shall be of a conventional type and will not trip.

The importance of the fast clearance of faults is obvious. Numerous inventions in this field confirm this. However, most of them are different from this invention by a basic point, specifically, they only start to operate when there is already a fault current and it has reached some predetermined level.

Modern current limiting circuit breakers use the force created by the flow of high current to disconnect their contacts. This approach requires some specific features of these circuit breakers. Because of the necessity to disconnect a high current and withstand the serious heating, the circuit breaker construction becomes rigid, heavy and expensive. The heavy rigid contacts with complicated arc extinguish system become, in themselves an impediment for fast disconnection of the circuit.

The present invention allows the detection of fault current conditions before the actual amplitude of the current reaches the abnormally high level and always distinguishes motor, transformer, capacitive or load transients from those of fault conditions. It enables the disconnection mechanism to be initiated even before the current in the circuit reaches a fault level. This, in turn, may change dramatically the protection system's design philosophy. Circuit breakers may become lighter, faster and less expensive. The installation of fast breakers in essential feeders can also solve coordination problems. It is important to note that circuit breakers with a rate-of-change of current protection with current feedback from loads still require an additional overload protection, which can be conventional thermal or electronic.

Although the invention has been described in connection with a preferred embodiment, it should be understood that various modifications, additions and alterations may be made to the invention by one skilled in the art without departing from the spirit and scope of the invention as defined in the appended claims.

What is claimed is:

1. A device for advanced protection from a short circuit current comprising:
    means for providing signals representative of the current in a supply feeder for all phases;
    means for providing signals representative of the current in a load which is supplied from said supply feeder for all phases;
    means for processing said signals representative of the current in the supply feeder separately for each phase to determine the rate-of-change of current in all phases of the supply feeder;
    means for processing said signals representative of the current in the supply feeder and said signals representative of the current in the load by subtraction of said signal representative of the current in the supply feeder from signal representative of the current in the load and producing the differential signals for all phases;
    means for comparing said rate-of-change of current in the supply feeder to a protective device first setting for each phase and producing a first conditional signal when the magnitude of said rate-of-change of current exceeds the protective device first setting;
    means for comparing said differential signal to a protective device second setting for each phase and producing a second conditional signal when the magnitude of said differential signal exceeds the protective device second setting;
    means of producing a tripping signal when the first and the second conditional signals are present simultaneously in one or more phases;
    and a means for opening a circuit in response to said tripping signal.

2. A method for opening a circuit in the event of a fault, said method comprising the steps of:
    producing signals representative of the current in a supply feeder for all phases;
    producing signals representative of the current in a load which is supplied from said supply feeder for all phases;
    processing said signals representative of the current in the supply feeder separately for each phase to determine the rate-of-change of current in all phases of the supply feeder;
    processing said signals representative of the current in the supply feeder and said signals representative of the current in the load by subtraction of said signal representative of the current in the supply feeder from signal representative of the current in the load and producing the differential signals for all phases;
    comparing said rate-of-change of current in the supply feeder to a protective device first setting for each phase and producing a first conditional signal when the magnitude of said rate-of-change of current exceeds the protective device first setting;
    comparing said differential signal to a protective device second setting for each phase and producing a second conditional signal when the magnitude of said differential signal exceeds the protective device second setting;
    producing a tripping signal when the first and the second conditional signals are present simultaneously in one or more phases;
    and initiating a circuit breaker opening in response to said tripping signal.

* * * * *